J. B. ADT.
DRIER.
APPLICATION FILED NOV. 5, 1918.

1,311,431.

Patented July 29, 1919.
7 SHEETS—SHEET 1.

Inventor
John B. Adt,
Henry G. Brewington.
By
Attorney

J. B. ADT.
DRIER.
APPLICATION FILED NOV. 5, 1918.

1,311,431.

Patented July 29, 1919.
7 SHEETS—SHEET 2.

Inventor
John B. Adt,
Henry F. Brewington
By
Attorney

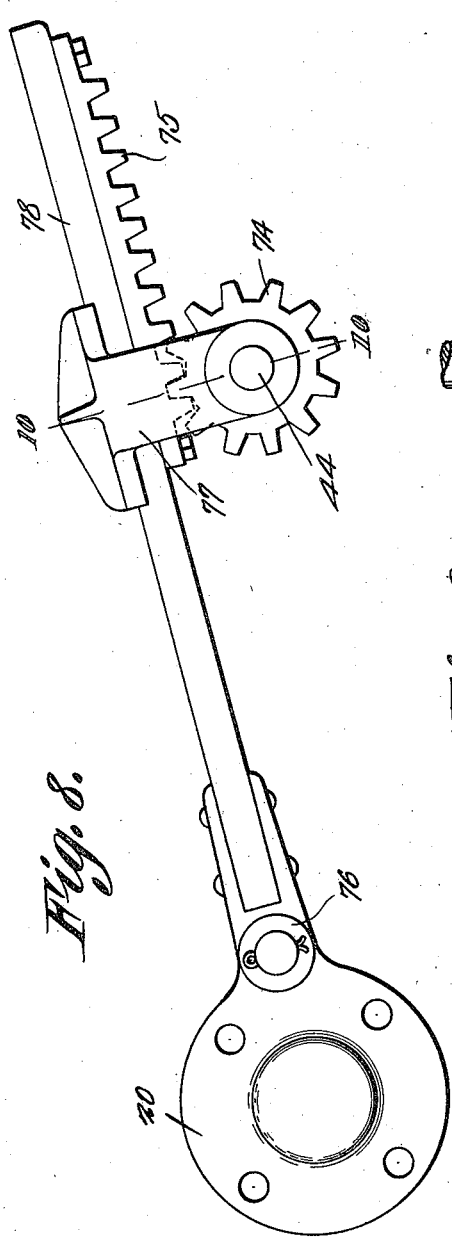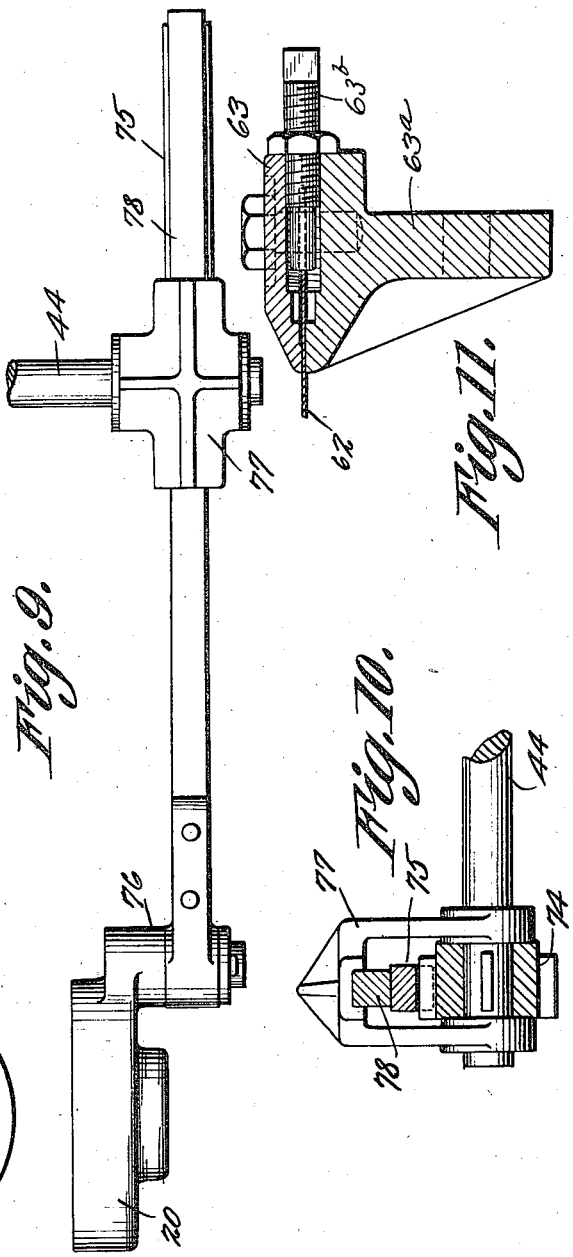

UNITED STATES PATENT OFFICE.

JOHN B. ADT, OF BALTIMORE, MARYLAND, ASSIGNOR TO JOHN B. ADT COMPANY, OF BALTIMORE, MARYLAND, A CORPORATION OF MARYLAND.

DRIER.

1,311,431.  Specification of Letters Patent.  Patented July 29, 1919.

Application filed November 5, 1918.  Serial No. 261,207.

*To all whom it may concern:*

Be it known that I, JOHN B. ADT, a citizen of the United States, residing at Baltimore, State of Maryland, have invented certain new and useful Improvements in Driers, of which the following is a specification.

This invention relates to driers, and has for its object to provide a machine of novel and improved construction, and one which has a large capacity and is highly efficient in operation.

The machine is designed more particularly for drying cooked potatoes to form a product known as "potato flake", but it will be understood that the machine can be employed with equal facility for drying other material.

The object stated is attained by means of a combination and arrangement of parts to be hereinafter described and claimed, and in order that the same may be better understood, reference is had to the accompanying drawings forming a part of this specification.

The preferred embodiment of the invention has been illustrated, but it will be understood that various changes and modifications in the structural details may be made without a departure from the spirit and scope of the invention as hereinafter claimed.

In the drawings,

Fig. 8 is an elevation of a driving mechanism;

Fig. 9 is a plan view of said mechanism;

Fig. 10 is a cross section on the line 10—10 of Fig. 8 with certain parts shown in elevation, and Fig. 11 is an enlarged sectional detail of a scraper and its support.

Figure 1:
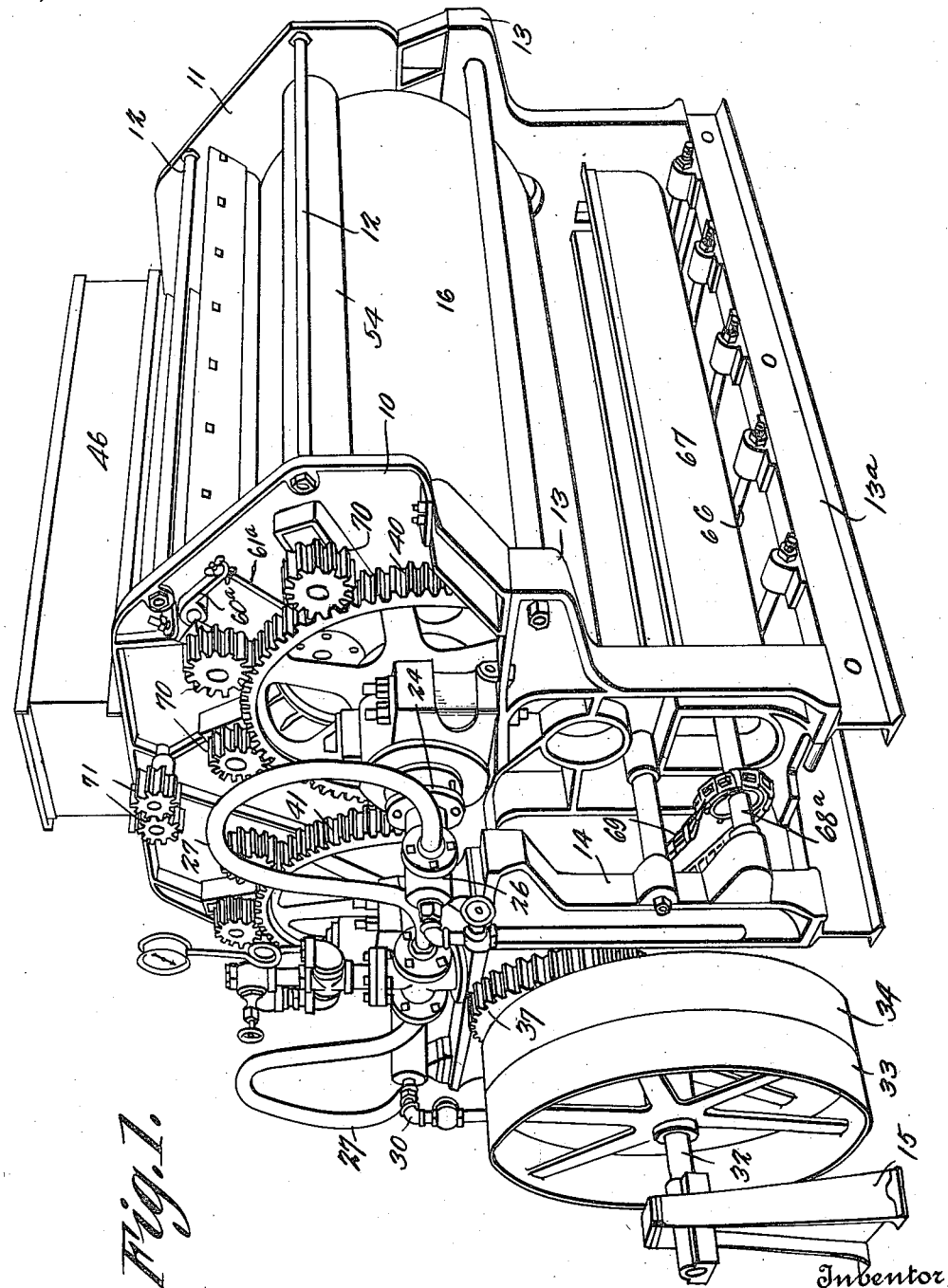
Figure 1 is a perspective view of the machine.

Referring specifically to the drawings, 10 and 11 denote two laterally spaced frame members designed to support the drying cylinders and other parts of the machine to be presently described. These frame members are connected in spaced relation by separator rods 12, and they have bottom portions 13 which are mounted on foundation beams 13$^a$. Adjacent to the frame member 10 is an outboard frame 14, and adjacent to the latter is a bearing stand 15.

Figure 2:
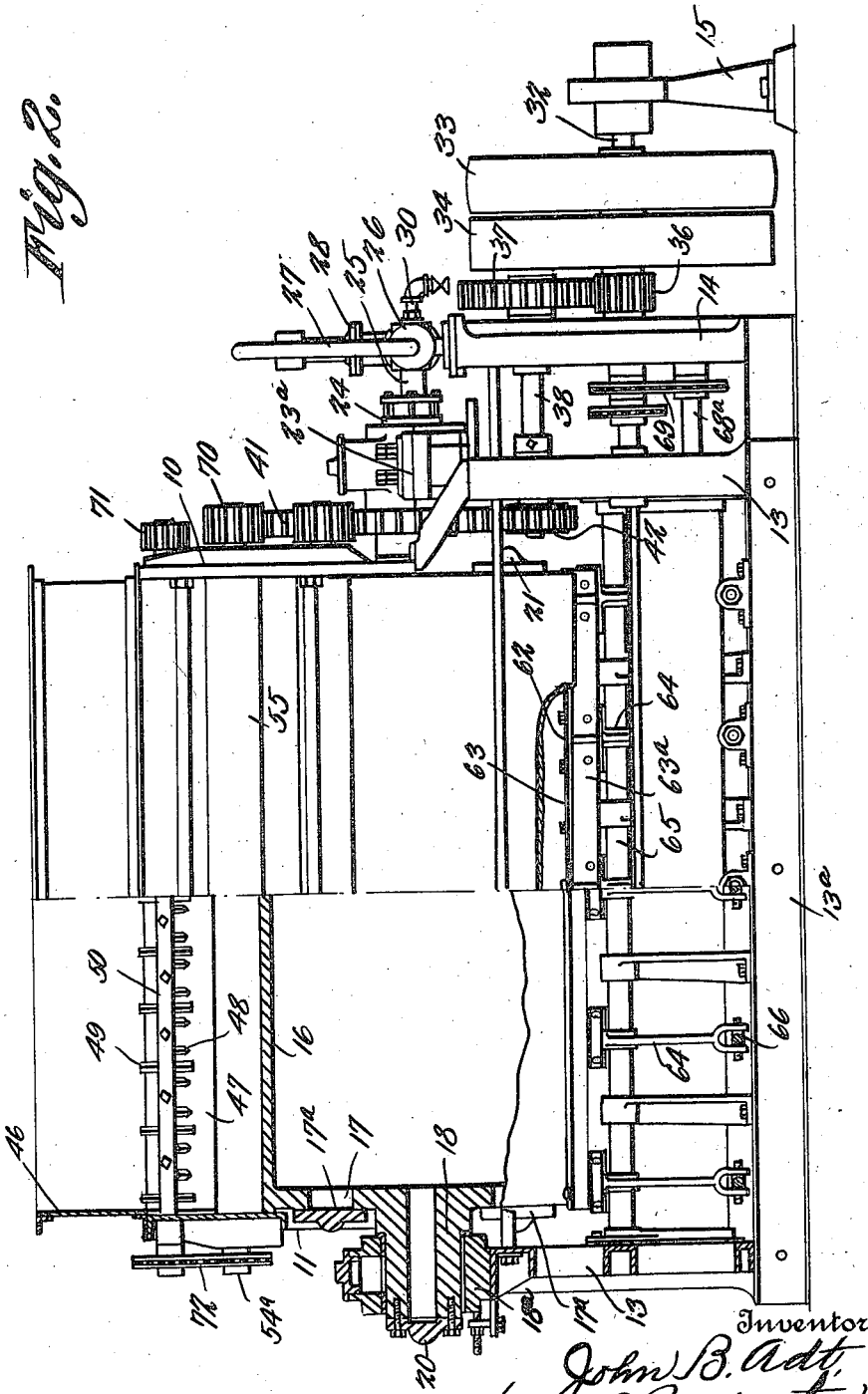
Fig. 2 is an elevation partly in section.
Figure 3:
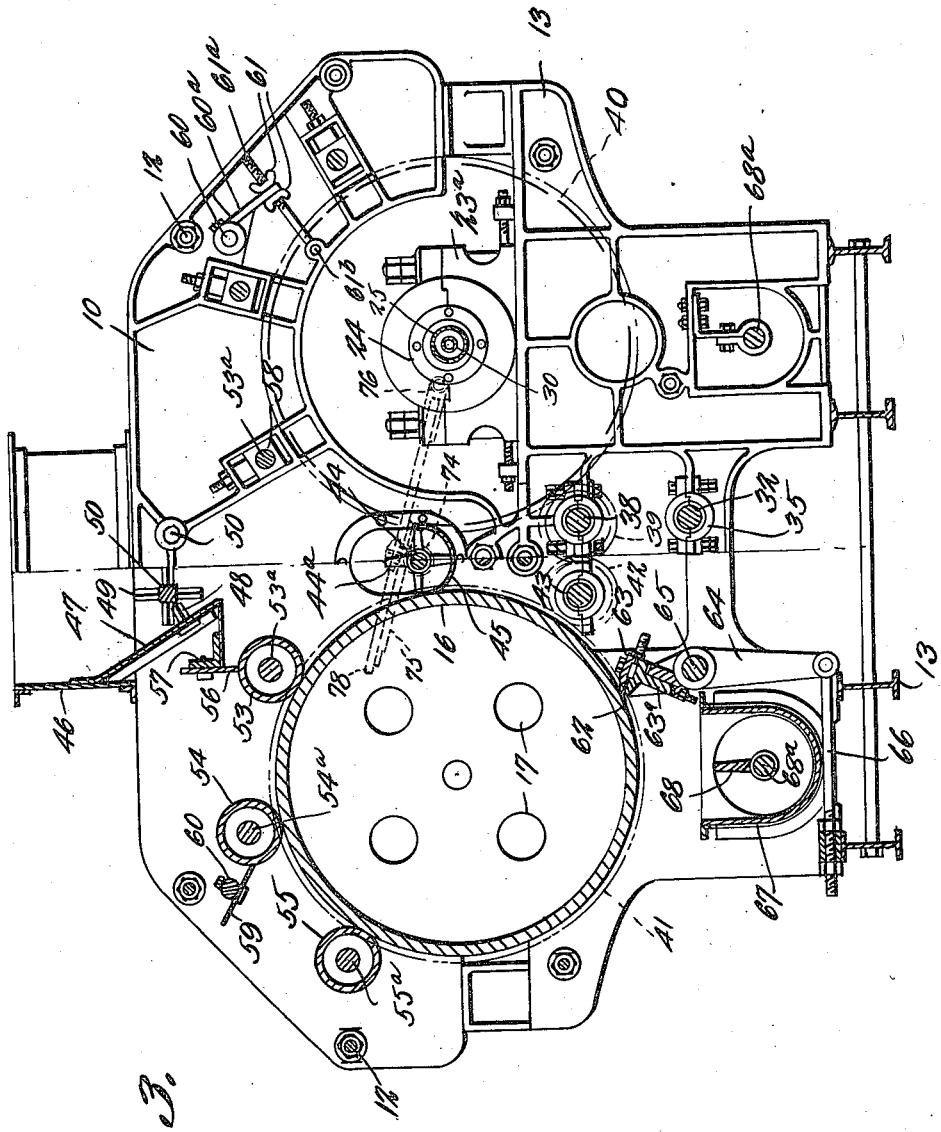
Fig. 3 is an end view partly in section.
Figure 4:
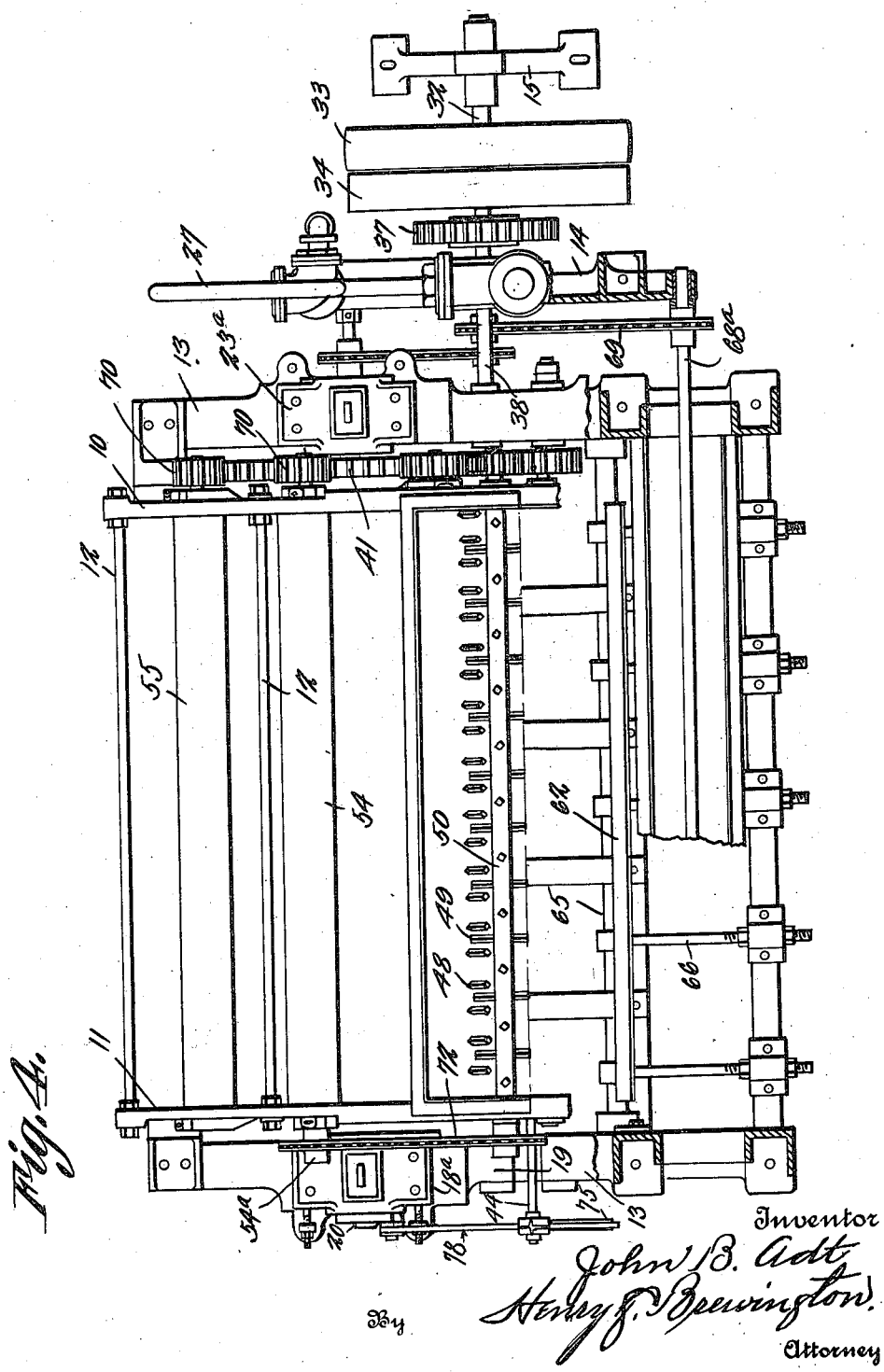
Fig. 4 is a plan view partly in section.

The machine is equipped with two drying cylinders positioned side by side in parallelism, and mounted to rotate about horizontal axes between the frame members 10 and 11. Fig. 2 shows a fragment of one of these cylinders at 16. The structure and mounting of the two cylinders is the same, and hence a description of one, suffices for both. A cross section of a cylinder 16 is shown in Fig. 3.

Figure 5:
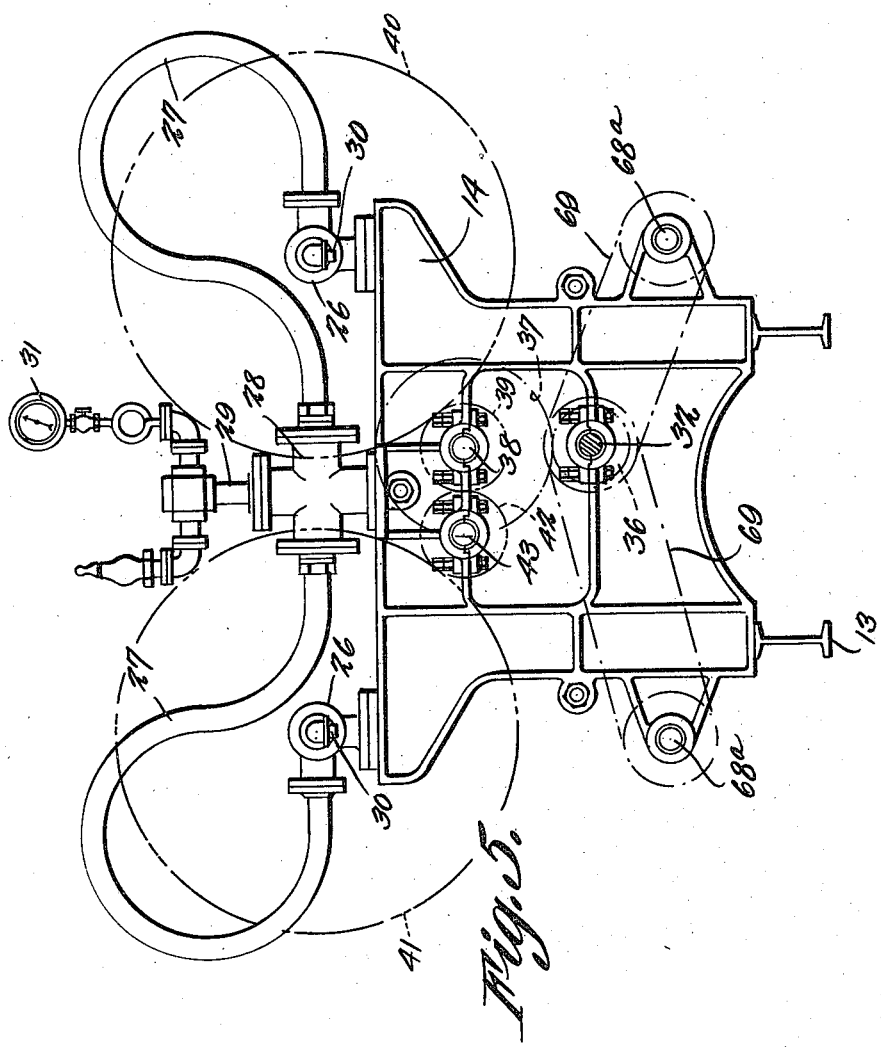
Fig. 5 is an elevation showing a steam connection.
Figure 6:
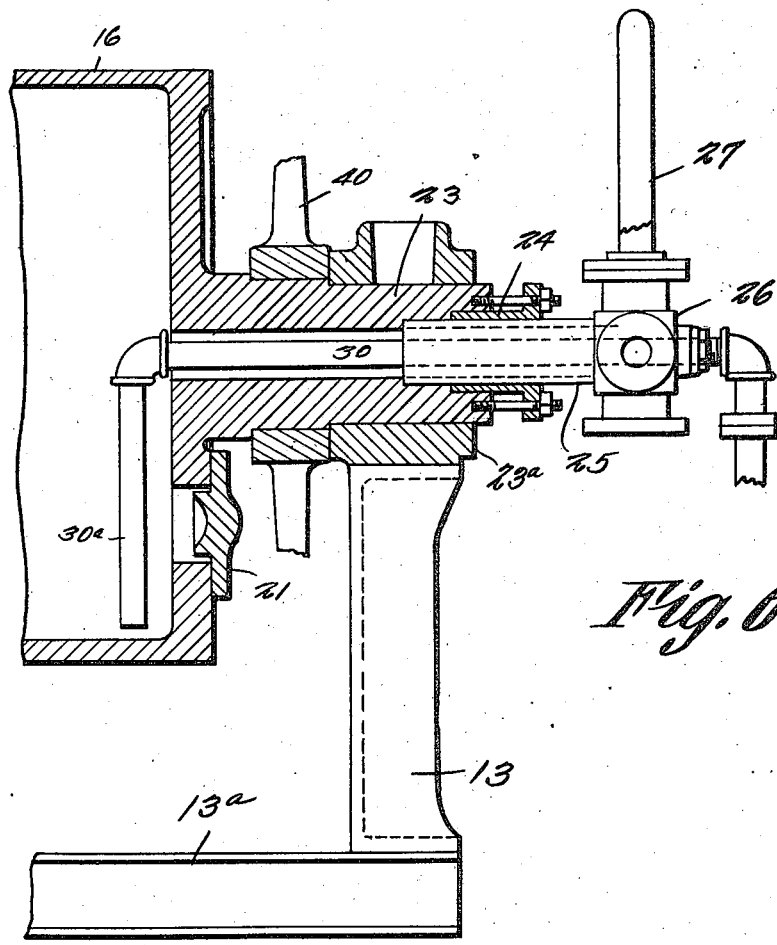
Fig. 6 is a sectional detail of the steam connection and also showing a siphon device.
Figure 7:
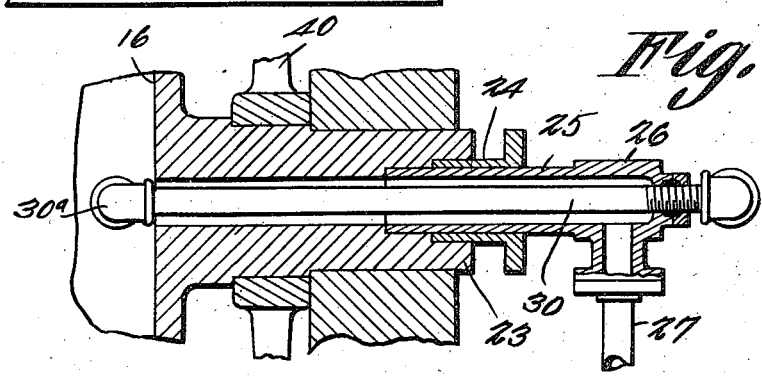
Fig. 7 is a horizontal section of the parts shown in Fig. 6.

The end of the drying cylinder 16 adjacent to the frame member 11 has hand holes 17 which are closed by covers 17$^a$, and this end of the cylinder has a trunnion 18 supported in a bearing 18$^a$ on the frame member 13 supporting the frame member 11. This trunnion is hollow and the outer end is provided with a cover 20. The other end of the cylinder also has hand holes which are closed by covers 21. The last mentioned end of the cylinder has a trunnion 23 similar to the trunnion 22, whereby it is supported in a bearing 23$^a$ on the frame 13 which supports the frame member 10. The trunnion 23 is also hollow and its outer end is fitted with a gland 24 through which enters a steam delivery pipe 25 leading from a steam chest 26 mounted on the stand 14. As shown in Fig. 5, a steam chest 26 is provided for each cylinder, and each steam chest is supplied by a curved pipe 27 leading from a T-coupling 28 to which latter a steam supply pipe 29 is connected. An exhaust pipe 30 passes through the chest 26, the pipe 25 and the trunnion 23, and enters the cylinder 16, in which latter it has a downward bend 30$^a$ terminating near the bottom of the cylinder and forming the shorter limb of a siphon to discharge the water of condensation collecting in the cylinder. The supply pipe 29 has a gage 31 and other customary fittings. The trunnion 18 is made hollow in order that the steam connection may be made with this end of the cylinder if desired.

The cylinders 16 are heated by live steam admitted thereinto through the connections just described, and they are rotated in opposite directions by being geared to a drive shaft 32 obtaining motion from a suitable power source, said shaft having fast and loose pulleys 33 and 34. This shaft is supported by the bearing stand 15 and a bearing 35 on the frame 13. On the shaft 32 is a pinion 36 which is in mesh with a driving gear 37 fast on a shaft 38 supported in bearings on the frame members 13 and 14. The shaft 38 also carries a pinion 39 which is in mesh with a large drive gear 40 on the trunnion 23 of one of the cylinders 16. The other cylinder is driven through a large gear 41 on its trunnion 23, said gear meshing with a pinion 42, which latter, in turn, is in mesh with the pinion 39. The pinion 42 is on a stub shaft 43 supported in a bearing 43$^a$ on the frame 13. The two cylinders 16 are therefore driven in opposite directions when power is applied to the shaft 32.

The cylinders 16 are spaced apart a sufficient distance to accommodate a feed distributer in the form of a shaft 44 armed with radial blades 44$^a$, this distributer working in a trough 45 fitting in the space between the cylinders at or about the horizontal center line thereof, and extending throughout their entire length so as to prevent the material from escaping downward between the cylinders.

Above the cylinders 16, the frame members 10 and 11 support a feed hopper 46, the latter being positioned to drop the material into the trough 45 between the cylinders. The hopper has downwardly converging opposite side walls 47 armed with outstanding comb teeth 48 between which work agitator fingers 49 extending radially from a shaft 50. Two of these agitators are provided, located in parallelism and side by side.

Above the horizontal center line of each cylinder 16 is mounted a set of three presser rollers, the same being indicated by the reference characters 53, 54 and 55. These rollers extend throughout the entire length of the cylinder and they are set close to the periphery thereof to compress the adhering material into a thin film or layer.

Associated with the roller 53 is a scraper blade 56 having its edge in contact with the periphery thereof to remove all material adhering thereto. This scraper is carried by an angle bar 57 extending between the frame members 10 and 11 and suitably supported thereby in any convenient manner to permit proper setting or adjustment of the scraper blade with respect to the roller. The shaft 53$^a$ of the roller 53 is supported in adjustable bearings 58 in order that said roller may be adjusted toward or from the surface of the cylinder 16. A similar adjustment is provided for the shafts of the rollers 54 and 55.

With the roller 54 is associated a scraper blade 59 carried by a rock shaft 60 so that the blade may be adjusted to properly engage the surface of the roller. The rock shaft 60 is supported by the frame members 10 and 11, and one end is fitted with a rocker arm 60$^a$ by which the shaft may be rocked to set the blade, this being done by adjusting nuts 61 threaded on a screw stem 61$^a$ passing loosely through the outer end of the arm, and pivotally supported by the frame member 10 as shown at 61$^b$.

Each cylinder 16 is also engaged by a bottom scraper blade 62 adjustably secured by clamps 63 to a knife bar 63$^a$ carried by one end of a series of levers 64 fulcrumed on a shaft 65, the other ends of the levers being connected to adjusting screws 66. The knife bar 63$^a$ can therefore be swung to properly position the blade 62 with respect to the cylinder, and as the blade is also adjustable on the bar, a fine adjustment is possible. The blade is of very thin flexible steel, and the adjustment is of vital importance in the successful operation of the machine. The rear edge of the blade is engageable by an adjusting screw 63$^b$ carried by the bar 63$^a$.

Beneath each cylinder 16, and positioned to receive the material removed therefrom by the scraper blade 62, is mounted a receptacle 67 in which a screw conveyer 68 works, which latter breaks up the material and works it out of the receptacle for proper disposal. The conveyer shaft 68$^a$ is driven by a sprocket-and-chain gearing 69 from the shaft 32.

The shafts of the rollers 53, 54 and 55 have pinions 70 on one end. These drive pinions of one set of rollers are in mesh with the cylinder drive gear 40, and the drive gear 41 of the other cylinder meshes with the other set of roller drive pinions.

The shafts 50 are geared together by pinions 71 and a drive is obtained by a sprocket-and-chain gearing 72 between one of said shafts and the shaft 54$^a$ of one of the rollers 54.

The distributer shaft 44 has an alternating rotary motion obtained through a pinion 74 on said shaft meshing with a reciprocatory rack 75 obtaining motion from a crank 76 on the cover 20 of one of the cylinder trunnions 18. The end of the shaft 44 carries a yoke 77 which guides the bar 78 carrying the rack 75.

The machine is designed primarily for drying potatoes. The cooked potatoes are fed into the hopper 46 where they are macerated by the revolving agitator fingers 49 and the comb teeth 48. The macerated potatoes fall into the trough 45 between the two steam heated cylinders 16, and are distributed on the peripheral surface of the latter by the oscillating feed agitator blades 44ª. The material adheres to the surface of the cylinders, and upon reaching the presser rollers 53 this adhering material is compressed into a thin layer, the rollers being set close to the cylinders to allow a fixed quantity of material to pass. A portion of the material clings to the rollers 53 and is scraped off by the blades 56 to drop back on the cylinders in advance of the rollers 53. This excess material scraped off the rollers 53 is carried by the cylinders to the next rollers 54 which are also set to allow a fixed quantity to pass. The loose material, and that already adhering to the cylinders and compressed by the rollers 53, now passes under the rollers 54, so that now a second thin layer emerges and travels forward with the cylinders. Any material adhering to the rollers 54 is removed by the scraper blades 59 and drops back on the cylinders to pass with the material adhering to the cylinders to the last rollers 55 which are also set to allow a fixed quantity to pass, so that now a third layer of material is pressed down on the surface of the cylinders. The material after leaving the rollers 55 is thoroughly dried and when it reaches the scraper blades 62 it is removed from the surfaces of the cylinders and drops into the conveyer troughs 67 where it is broken up and fed from the machine by the conveyer 68. The skins do not stick to the heated cylinders but accumulate on the rollers 55 from which they may be scraped off at intervals by a hand scraper, or a scraper attached to the frame of the machine. By applying the material to the cylinder in three layers or films the drying operation is greatly facilitated, and there is also obtained a thicker flake with a consequent increase in capacity.

The machine herein described is what might be termed a double machine, it is obvious however that a machine may be constructed with a single cylinder as well as with a plurality of cylinders, the changes necessary to accomplish such a machine or machines not being material and only such changes and alterations as are well within the scope of the invention.

I claim:

1. In a drier, a heated rotary drying cylinder, means for depositing the material to be dried on the surface of the cylinder to adhere thereto, a plurality of means associated with the cylinder and successively intercepting the advancing adhering material for compressing the same into a relatively thin film on the cylinder surface, means for removing adhering material on said compressing means and redepositing the same on the cylinder, and means for removing the finished product from the cylinder surface.

2. In a drier, a heated rotary drying cylinder, means for depositing the material to be dried on the surface of the cylinder to adhere thereto, presser rollers in the path of the advancing adhering material for compressing the same into a relatively thin film on the cylinder surface, means for removing adhering material on the rollers and redepositing the same on the cylinder, and means for removing the finished product from the cylinder surface.

3. In a drier, a heated rotary drying cylinder, means for depositing the material to be dried on the surface of the cylinder to adhere thereto, means in the path of the advancing adhering material for compressing the same into a relatively thin film on the cylinder surface, means for removing adhering material on said compressing means and redepositing the same on the cylinder, and means for removing the finished product from the cylinder surface.

4. In a drier, a heated rotary drying cylinder, means for depositing the material to be dried on the surface of the cylinder to adhere thereto, a series of presser rollers successively set in the path of the adhering material and located to press the same onto the cylinder surface, and scrapers associated with certain ones of the rollers for removing material adhering thereto, the last mentioned rollers being positioned with respect to the cylinder to allow the scraped-off material to drop back on the cylinder, and means for removing the finished product from the cylinder surface.

5. In a drier, a pair of heated drying cylinders, a material receptacle positioned between the cylinders, means for feeding material from said receptacle onto the surfaces of the cylinders to adhere thereto, means for compressing the adhering material into a relatively thin film on the cylinders, means for removing adhering material on said compressing means and redepositing the same on the cylinders, and means for removing the finished product from the cylinders.

In testimony whereof I affix my signature in the presence of two witnesses.

JOHN B. ADT.

Witnesses:
ALBERT W. ADT,
LOUIS H. ZEUN.